(12) United States Patent
Herman et al.

(10) Patent No.: US 12,067,149 B2
(45) Date of Patent: Aug. 20, 2024

(54) EMBEDDED METADATA FOR DATA PRIVACY COMPLIANCE

(71) Applicant: FORD GLOBAL TECHNOLOGIES, LLC, Dearborn, MI (US)

(72) Inventors: David Michael Herman, West Bloomfield, MI (US); Jon Speigle, Livonia, MI (US); Brian Tamm, Pleasant Ridge, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 270 days.

(21) Appl. No.: 17/317,549

(22) Filed: May 11, 2021

(65) Prior Publication Data

US 2022/0366082 A1    Nov. 17, 2022

(51) Int. Cl.
| | | |
|---|---|---|
| G06F 21/62 | (2013.01) | |
| G06F 16/11 | (2019.01) | |
| G06F 16/23 | (2019.01) | |
| H04L 9/40 | (2022.01) | |

(52) U.S. Cl.
CPC ........ *G06F 21/6254* (2013.01); *G06F 16/125* (2019.01); *G06F 16/2379* (2019.01); *H04L 63/105* (2013.01)

(58) Field of Classification Search
CPC .............. G06F 21/6254; G06F 16/125; G06F 16/2379; G06F 21/64; H04L 63/105; H04L 63/04; H04W 4/40; H04W 12/009; H04W 12/08; H04W 12/61; H04W 12/63; H04W 12/02
See application file for complete search history.

(56) References Cited

U.S. PATENT DOCUMENTS

| | | | |
|---|---|---|---|
| 10,839,104 B2 | 11/2020 | Balzer et al. | |
| 11,157,648 B1 * | 10/2021 | Amico | ................ G06F 21/6254 |
| 11,496,446 B1 * | 11/2022 | Angara | ............... G06F 21/6245 |
| 11,748,510 B1 * | 9/2023 | Beveridge | ........... G06F 21/6245 |
| | | | 726/27 |
| 2011/0040736 A1 * | 2/2011 | Kalaboukis | ............. H04L 67/01 |
| | | | 707/E17.014 |
| 2012/0143824 A1 | 6/2012 | Doshi et al. | |
| 2014/0047551 A1 * | 2/2014 | Nagasundaram | ..... H04L 63/107 |
| | | | 726/26 |
| 2016/0188893 A1 | 6/2016 | Ghafourifar | |
| 2016/0294781 A1 | 10/2016 | Ninan et al. | |
| 2019/0347442 A1 * | 11/2019 | Marlin | .................. G07F 19/206 |
| 2019/0377901 A1 | 12/2019 | Balzer et al. | |
| 2022/0269812 A1 * | 8/2022 | Baez | ....................... G06F 21/50 |

\* cited by examiner

*Primary Examiner* — Wasika Nipa
*Assistant Examiner* — Andrew Suh
(74) *Attorney, Agent, or Firm* — Frank Lollo; Brooks Kushman P.C.

(57) ABSTRACT

Use of embedded metadata for data privacy compliance is provided. In a data store, self-managed data is maintained including metadata specifying retention policy data. Responsive to a self-update to scrub PII from the self-managed data being indicated by the retention policy data, the PII is removed from the self-managed data maintained by the data store. Responsive to a self-update to delete the self-managed data from the self-managed data being indicated by the retention policy data, the self-managed data is removed from the data store.

18 Claims, 5 Drawing Sheets

EMBEDDED METADATA FOR DATA PRIVACY COMPLIANCE

TECHNICAL FIELD

Aspects of the disclosure relate to the use of embedded metadata for data privacy compliance.

BACKGROUND

Data may include personally identifiable information (PII). PII may include many forms of information that could identify a human being. PII may include textual information such as names, addresses, and birth dates. PII may include other information as well, such as photographs of people, house addresses, or vehicle license plates. PII data may be described as structured or unstructured. Data analytics may require the use of large sets of collected data. These data sets may include PII.

SUMMARY

In a first illustrative embodiment, a system for use of embedded metadata for data privacy compliance is provided. A data store is configured to maintain self-managed data, the self-managed data including metadata specifying retention policy data. One or more servers are programmed to, responsive to a self-update to scrub PII from the self-managed data being indicated by the retention policy data, remove the PII from the self-managed data maintained by the data store. Responsive to a self-update to delete the self-managed data from the self-managed data being indicated by the retention policy data, the one or more servers are programmed to remove the self-managed data from the data store.

In a second illustrative embodiment, a method for use of embedded metadata for data privacy compliance is provided. In a data store, self-managed data is maintained including metadata specifying retention policy data. Responsive to a self-update to scrub PII from the self-managed data being indicated by the retention policy data, the PII is removed from the self-managed data maintained by the data store. Responsive to a self-update to delete the self-managed data from the self-managed data being indicated by the retention policy data, the self-managed data is removed from the data store.

In a third illustrative embodiment, a non-transitory computer-readable medium includes instructions that, when executed by one or more servers, cause the one or more servers to perform operations including to maintain, in a data store, self-managed data including metadata specifying retention policy data; periodically check the retention policy data of the self-managed data to determine whether to perform a self-update to scrub PII or a self-update to delete the self-managed data; responsive to the self-update to scrub PII from the self-managed data being indicated by the retention policy data, remove the PII from the self-managed data maintained by the data store; responsive to the self-update to delete the self-managed data from the self-managed data being indicated by the retention policy data, remove the self-managed data from the data store; and responsive to receipt of a removal request from a client device, the removal request indicating to remove PII of a user, remove PII from the self-managed data matching the user from the data store.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Vehicle sensors, such as cameras, may acquire both PII data and non-PII data. In an example, vehicles are increasingly being equipped with in-cabin cameras (e.g., for driver state monitoring). These cameras may capture PII of vehicle occupants. Other vehicle sensors may capture when and where the vehicle is located, which could be tied to the user as well. PII data may be stored in various forms. In some examples, the PII may be maintained in structured data following a rigid format (e.g., database tables). In other examples, the PII may be maintained in an unstructured manner, such as files in a directory.

The collection and sharing of such data may raise PII and/or privacy issues if the collection is performed without consent. For instance, the transfer of this data may create compliance burdens with General Data Protection Regulation (GDPR) or other privacy laws. Additionally, if the user initially consents but later decides to have the data removed (e.g., a right to forget request), it would be desirable to have a mechanism to allow the data to be automatically purged of PII. In another aspect, data may be coded to automatically expire and be purged in accordance with a data retention policy. In yet a further aspect, a user may request an export of his or her stored data for portability. These and other aspects to the maintenance of the data may be accomplished through use of self-managed data that included embedded metadata.

Figure 1:
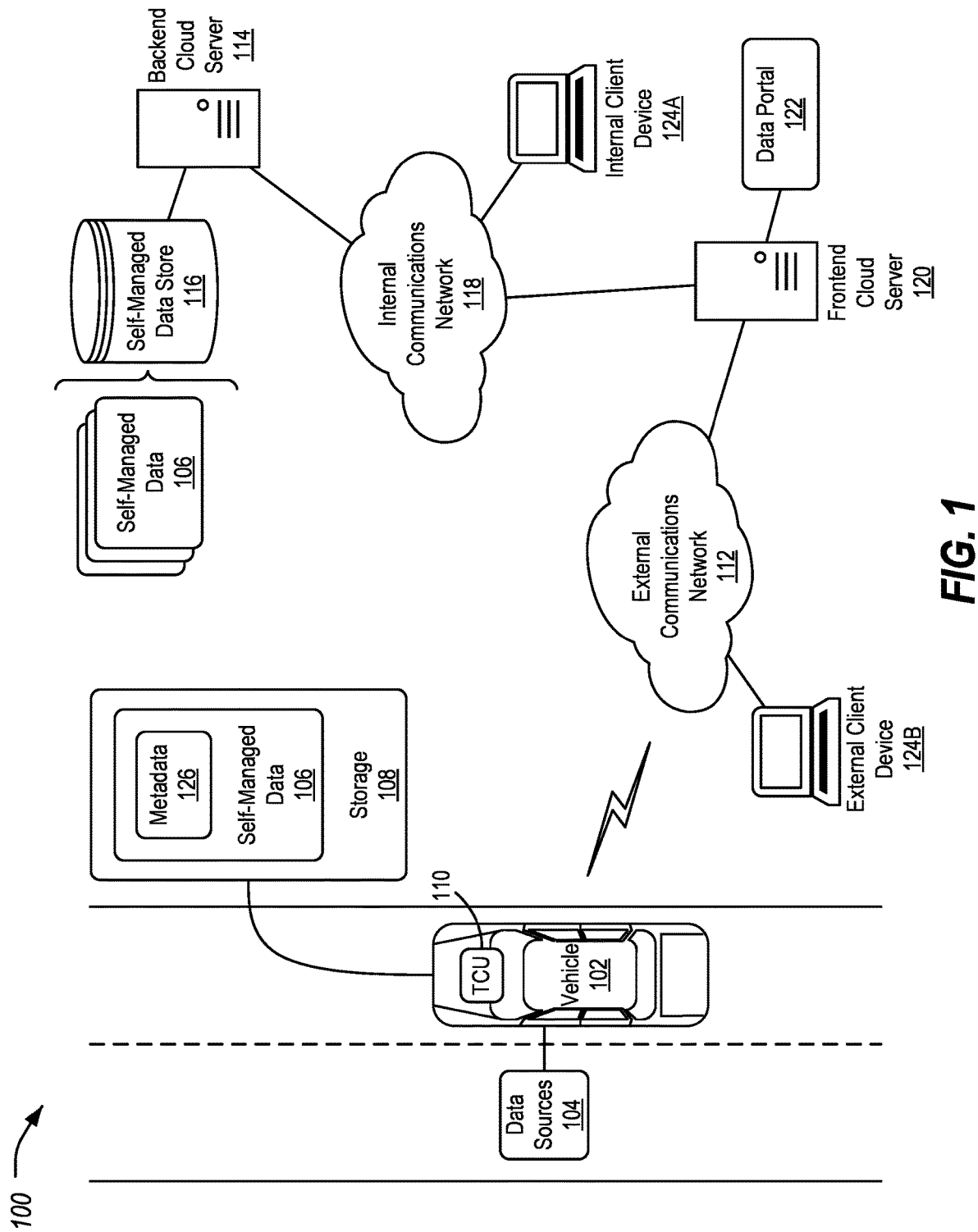
FIG. 1 illustrates an example system for use of embedded metadata for data privacy compliance.

FIG. 1 illustrates an example system 100 for use of embedded metadata for data privacy compliance. In such a system, a vehicle 102 may utilize one or more data sources 104 to capture self-managed data 106. The vehicle 102 may include a storage 108 configured to maintain the self-managed data 106. The vehicle 102 may also include a telematics control unit (TCU) 110 configured to communicate over an external communications network 112. A back-end cloud server 114 is configured to host a secure data store maintaining the self-managed data 106. A front-end cloud server 120 is configured to access the back-end cloud server 114 to provide a data portal 122 to client devices 124. An internal client device 124A and an external client device 124B are shown. As explained in detail below, the system 100 may be configured to receive self-managed data 106 from the data sources 104, provide access to the self-managed data 106 via the client devices 124, and maintain the self-managed data 106 in accordance with embedded metadata within the self-managed data 106. It should be noted that the system 100 is an example, and systems 100 having more, fewer, or different elements may be used. For instance, while one vehicle 102, back-end cloud server 114, and front-end cloud server 120 are shown, it is contemplated that systems 100 could include many vehicles 102, back-end cloud servers 114, and/or front-end cloud servers 120 for load balancing or other networking purposes.

The vehicle 102 may include various types of automobile, crossover utility vehicle (CUV), sport utility vehicle (SUV), truck, recreational vehicle (RV), boat, jeepney, plane or other mobile machine for transporting people or goods. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The data sources 104 may include various devices configured to capture self-managed data 106 of the vehicle 102 environment. In an example, the data sources 104 may include visible light cameras or infrared cameras configured to capture still images and/or video data. In another example, the data sources 104 may include sensors configured to determine three-dimensional (3D) information, such as radar sensors or lidar sensors. The self-managed data 106 may be stored to a database, memory, or other storage 108 of the vehicle 102.

In some instances, the data sources 104 may be configured to capture self-managed data 106 of the surroundings of the vehicle 102. For instance, the data sources 104 may be configured to generate self-managed data 106 of the roadway, of other vehicles 102, of pedestrians, or of obstacles. Some data sources 104 may additionally or alternately be configured to capture self-managed data 106 inside of the vehicle 102, such as of the vehicle 102 cabin. As some other examples, the data sources 104 be configured to generate self-managed data 106 with respect to the location or routing of the vehicle 102. In another example, the data sources 104 may be configured to generate self-managed data 106 with respect to diagnostic codes issued by components of the vehicle 102.

While the self-managed data 106 is described in terms of a vehicle 102 environment, it should be noted that in other examples, the self-managed data 106 may be provided by other types of data sources 104. For instance, the self-managed data 106 may include images captured by a user's mobile device, textual files drafted by user's various work processing devices, etc.

The TCU 110 may be configured to provide telematics services to the vehicle 102. These services may include, as some non-limiting possibilities, navigation, turn-by-turn directions, vehicle health reports, local business search, accident reporting, and hands-free calling. The TCU 110 may accordingly be configured to utilize a transceiver to communicate via the external communications network 112.

The external communications network 112 may provide communications services, such as packet-switched network services (e.g., Internet access, voice over Internet Protocol (VoIP) communication services), to devices connected to the external communications network 112. An example of the external communications network 112 is a cellular telephone network. For instance, the TCU 110 may access the cellular network via connection to one or more cellular towers. To facilitate the communications over the external communications network 112, the TCU 110 may be associated with unique device identifiers (e.g., mobile device numbers (MDNs), Internet protocol (IP) addresses, etc.) to identify the communications of the TCU 110 on the external communications network 112 as being associated with the vehicle 102.

The back-end cloud server 114 may include various types of computing apparatus, such as a computer workstation, a server, a desktop computer, a virtual server instance executed by a mainframe server, or some other computing system and/or device. Computing devices, such as the back-end cloud server 114, generally include a memory on which computer-executable instructions may be maintained, where the instructions may be executable by one or more processors of the computing device. Such instructions and other data may be stored using a variety of computer-readable media. A computer-readable medium (also referred to as a processor-readable medium or storage) includes any non-transitory (e. g., tangible) medium that participates in providing data (e.g., instructions) that may be read by a computer (e.g., by the processor of the back-end cloud server 114). In general, processors receive instructions, e.g., from the memory via the computer-readable storage medium, etc., and executes these instructions, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, JavaScript, Perl, etc.

A self-managed data store 116 may be one such application included on the storage of the back-end cloud server 114. The self-managed data store 116 may include instructions that, when loaded into memory and executed by the back-end cloud server 114, cause the back-end cloud server 114 to perform database functionality including the storage, update, and retrieval of relational information. Databases or data repositories such as the self-managed data store 116 may include various kinds of mechanisms for storing, accessing, and retrieving various kinds of data (such as the self-managed data 106), including a hierarchical database, a set of files in a file system, an application database in a proprietary format, a relational database management system (RDBMS), etc. The self-managed data store 116 may employ features of the computer operating system of the back-end cloud server 114 and may be accessed via an internal communications network 118 in a variety of manners. The back-end cloud server 114 may be inaccessible from the external communications network 112. The self-managed data store 116 may also utilize the file system via the computer operating system and may store and retrieve include files stored in various formats. An RDBMS may employ structured query language (SQL), for instance, in addition to a language for creating, storing, editing, and executing stored procedures. In an example, data files such as video, point cloud, and/or raw radar data may be stored in a file system, while a database may be used to index keys to the file locations of the data files (e.g., on a storage array). In some examples, the self-managed data store 116 may also maintain hash values of collected sensor data in each file to aid in the location and/or fusing of data.

Similar to as discussed above with respect to the back-end cloud server 114, the front-end cloud server 120 may include various types of computing apparatus including a memory on which computer-executable instructions may be maintained, where the instructions may be executable by one or more processors of the computing device. The front-end cloud server 120 may be configured to maintain a data portal 122 accessible to client devices 124. In an example, the front-end cloud server 120 may be configured to provide the data portal 122 by using a web server application. As another possibility, the front-end cloud server 120 may execute a server application that may be accessed by a dedicated client application of a connecting client device 124. The data portal 122 may be accessible to external client devices 124B over the external communications network 112 and may be accessible to internal client devices 124A over the internal communications network 118.

The data portal 122 may be an application or library included on the storage of or otherwise accessible by the back-end cloud server 114. When accessed, the data portal 122 may be configured to allow the user to access, view, and update aspects of the self-managed data 106 maintained by the self-managed data store 116.

The client devices 124 include various devices usable to access the data portal 122 provided by the back-end cloud server 114. The client devices 124 may include laptop computers, tablet or other handheld computers, mobile phones, computer workstations, servers, desktop computers, or other types of computing systems and/or devices. In an example, the client devices 124 may be configured to access the data portal 122 by using a web browser application. As another possibility, the client devices 124 may execute a dedicated client application, configured to provide access to the data portal 122 (e.g., as downloaded from an application store such as the App Store provided by Apple, Inc.).

In some cases, a first level of access may be provided to the internal client devices 124A that access the data portal 122 via the internal communications network 118, and a second level of access may be provided to the external client devices 124B that access the data portal 122 via the external communications network 112. This may allow, in one example, for the internal client device 124A to be able to access the self-managed data 106 including embedded PII, while the external client device 124B may be able to access the self-managed data 106 but without the embedded PII.

Figure 2:
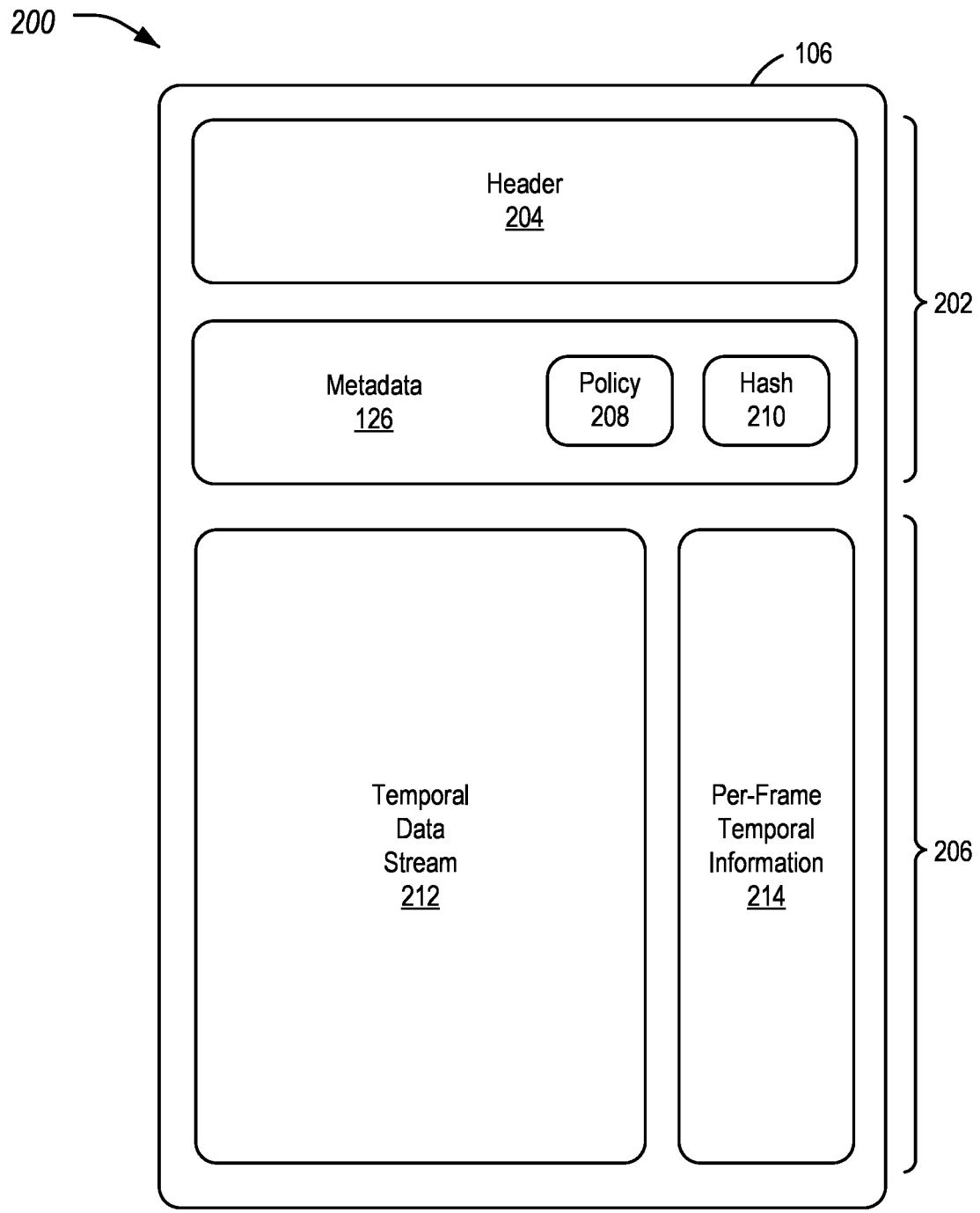
FIG. 2 illustrates an example of details of the self-managed data.

As shown in FIG. 2, and with continued reference to FIG. 1, the self-managed data 106 may include a static payload 202 including header information 204 and metadata 126 descriptive of various aspects of the self-managed data 106. In an example, the metadata 126 may indicate a place and/or a time at which the self-managed data 106 was captured. The metadata 126 may also indicate a last edit time and/or a last access time for the self-managed data 106. In another example, the metadata 126 may indicate the user who created the self-managed data 106 and/or the user who last edited the self-managed data 106.

The metadata 126 may also describe aspects of the information included in the self-managed data 106. For instance, the metadata 126 may indicate the existence or locations of PII in the self-managed data 106. This PII may include, as some examples, location, date/time, vehicle orientation, etc. inside a temporal payload 208 of the self-managed data 106.

The metadata 126 may also include retention policy data 206. The retention policy data 206 may indicate information such as a retention period for the self-managed data 106 and/or for the PII within the self-managed data 106. The retention policy data 206 may further specify aspects of how the self-managed data 106 may be used during the retention period. For instance, in some cases the self-managed data 106 may have a first active period where the self-managed data 106 is in use and editable, and a second period once the data is no longer active, in which the content is to be maintained but cannot be edited (or may be accessible to a narrower set of client devices 124, such as internal client devices 124A but not external client devices 124B). The metadata 126 may further include a hash value 210. This hash value 210 may include a hash computed of the temporal payload 208, e.g., for tampering or data security purposes.

The temporal payload 208 may include the content of the self-managed data 106 received from the data sources 104. For instance, this may include a temporal data stream 212 and per-frame temporal data 214. In an example, the temporal data stream 212 may include frames of a video feed, and the per-frame temporal data 214 may include aspects the data within each frame. In another example, the temporal data stream 212 may include sets of sensor data in a sequence of sensor data, and the per-frame temporal data 214 may include aspects the data within each set.

Figure 3:
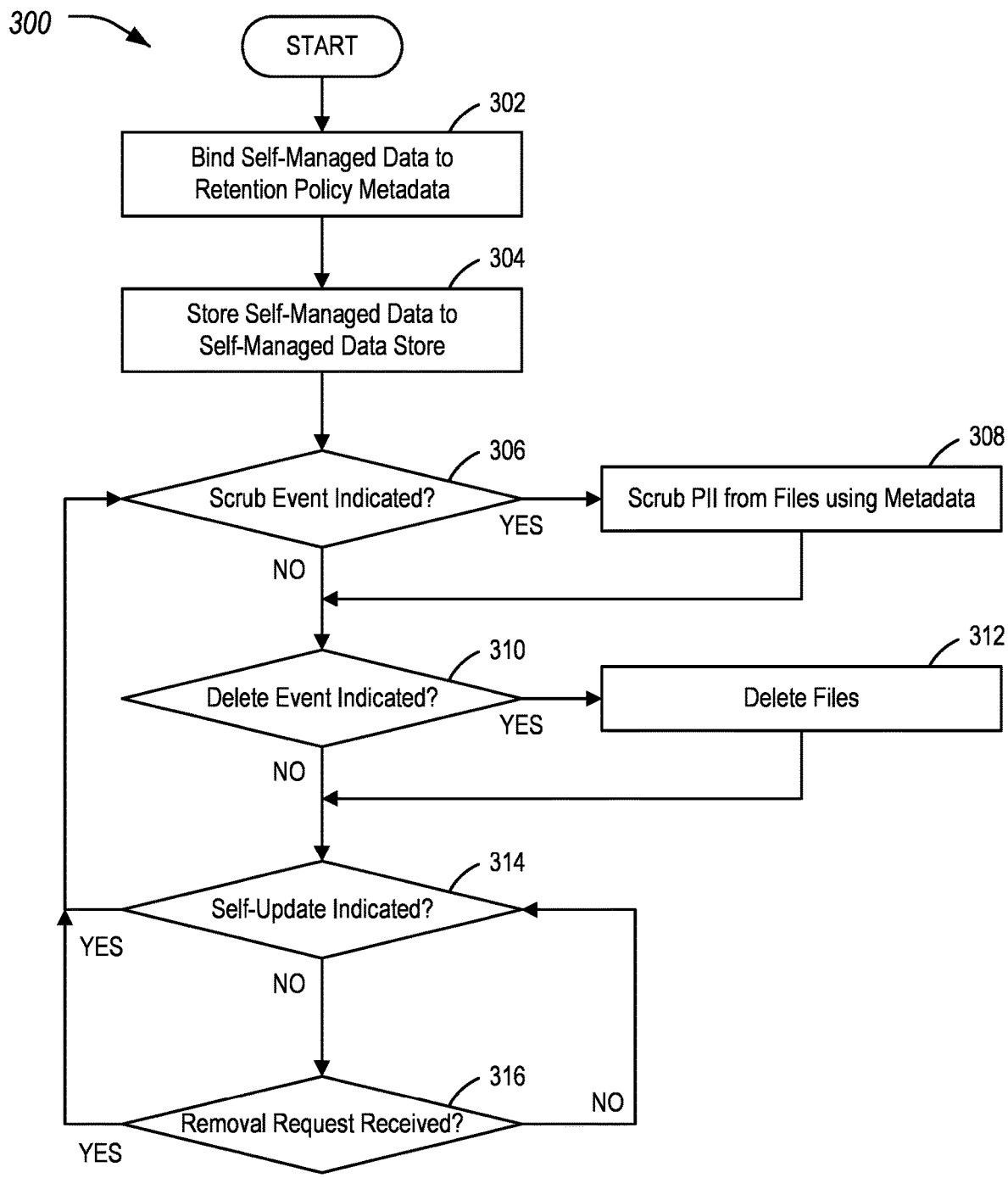
FIG. 3 illustrates an example process for self-management of the self-managed data.

FIG. 3 illustrates an example process 300 for self-management of the self-managed data 106. In an example, the process 300 may be performed by the back-end cloud server 114 in the context of the system 100.

At operation 302, the back-end cloud server 114 binds self-managed data 106 to retention policy data 206. In an example, the self-managed data 106 may be received including retention policy data 206 in the metadata 126. In such examples, the back-end cloud server 114 may store the self-managed data 106 as received to the self-managed data store 116. In another example, the self-managed data 106 may be received without retention policy data 206. In such an example, the back-end cloud server 114 may apply retention policy data 206 to the self-managed data 106 by adding retention policy data 206 to the metadata 126.

This retention policy data 206 may indicate a default retention policy applied to all self-managed data 106 stored to the self-managed data store 116. Or in another example, different retention policy data 206 may be applied to the self-managed data 106 based on the metadata 126 of the self-managed data 106. For instance, metadata 126 files of one indicated type (e.g., textual documents) may have a first retention policy data 206 applied, while metadata 126 files of a different type may have a second retention policy data 206 applied.

At operation 304, the back-end cloud server 114 stores the self-managed data 106 to the self-managed data store 116. Accordingly, the self-managed data 106 may be available for access as discussed below with respect to process 400.

At operation 306, the back-end cloud server 114 determines whether a scrub event is indicated. In an example, the back-end cloud server 114 may determine, based on the retention policy data 206 of the self-managed data 106, whether a timeframe for the removal of PII from the self-managed data 106 has been met. For instance, the retention policy data 206 may indicate a time period after which PII should be removed, a period of time from addition of the self-managed data 106 to the self-managed data store 116 after which the PII should be removed, and/or an event (e.g., completion of a project, end of a litigation, etc.) after which the PII should be removed. In another example a scrub event may include a data portability request where a user requests images captured of him or herself. The request may in some examples, include further information such as a location and/or an image of the user to aid in location of the images. If such a scrub event has occurred, control passes to operation 308, in which the PII is removed from the self-managed data 106. If not, control passes to operation 310.

At operation 310, the back-end cloud server 114 determines whether a delete event is indicated. Similar to as indicated at operation 306, the delete event may similarly be indicated based on information in the retention policy data 206, such as a time period after which the self-managed data 106 should be deleted, a period of time from addition of the self-managed data 106 to the self-managed data store 116 after which the self-managed data 106 should be deleted, and/or an event (e.g., completion of a project, end of a litigation, etc.) after which the self-managed data 106 should be deleted. If such a delete event has occurred, control passes to operation 312, in which the self-managed data 106 is deleted from the self-managed data store 116. If not, control passes to operation 314.

At operation 314, the back-end cloud server 114 determines whether to perform a self-update event. In an example, the back-end cloud server 114 may periodically check to see if scrub events or delete events are indicated, e.g., hourly, daily, etc. In another example, the back-end cloud server 114 may check whether scrub events or delete events are indicted based on trigger conditions, such as an operator request, completion of a project, end of a litigation, reaching a particular time or date, etc. If a self-update event is indicated, control passes to operation 306. If not, the process 300 continues to operation 316.

At operation 316, the back-end cloud server 114 determines whether a removal request is received. For instance, a user may make a request to have any self-managed data 106 of the user that is stored to the self-managed data store 116 be scrubbed of PII and/or deleted. This may be done, for example, to satisfy a right to forget request. In another example, a user may request to have his or her data moved to another location or given to the user. If a removal request is received, control passes to operation 306 to perform the request. If not, control returns to operation 314.

Figure 4:
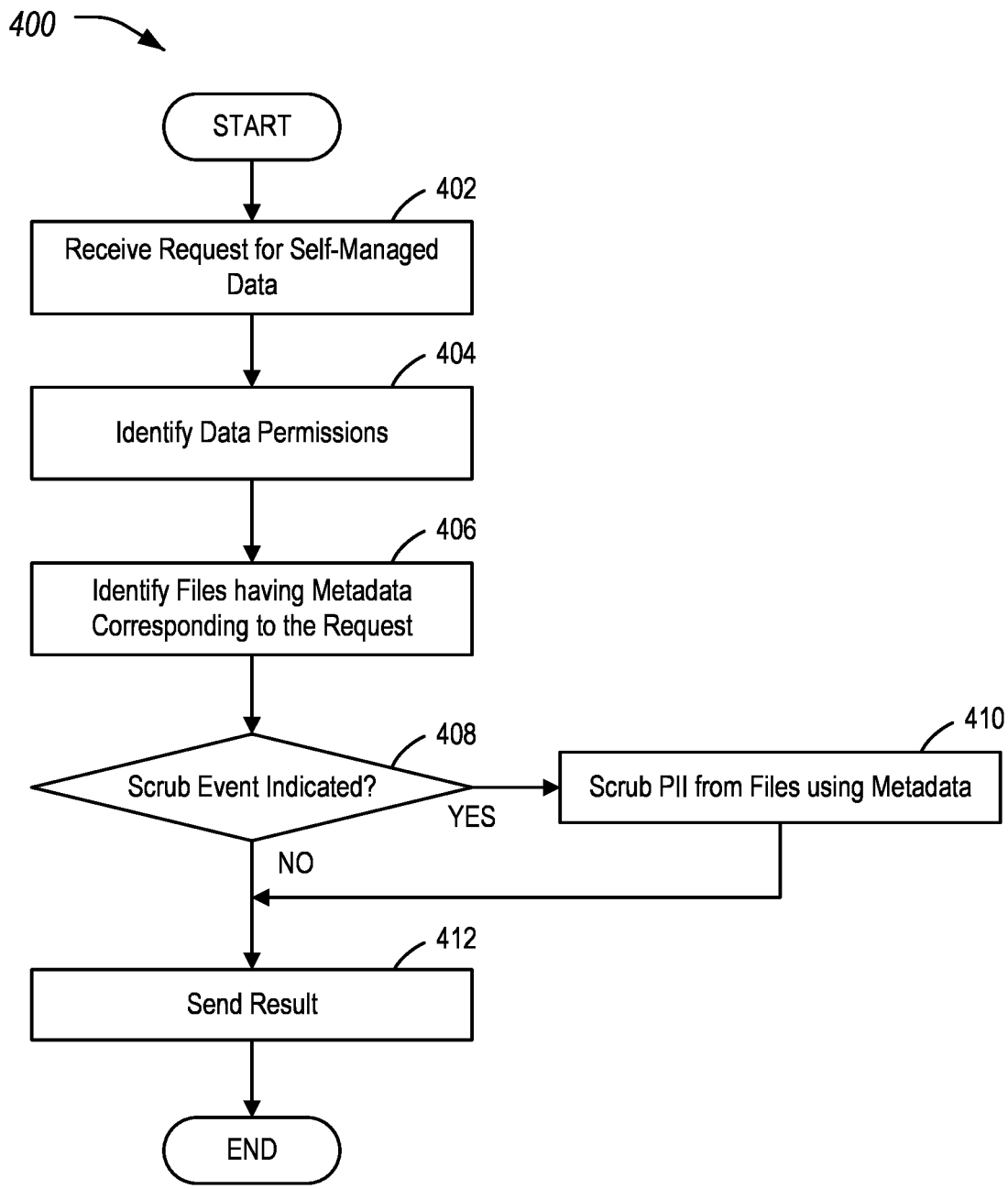
FIG. 4 illustrates an example process for controlled access to the self-managed data by client devices.

FIG. 4 illustrates an example process 400 for controlled access to the self-managed data 106 by client devices 124. In an example, as with the process 300, the process 400 may be performed by the back-end cloud server 114 in the context of the system 100.

At operation 402, the back-end cloud server 114 receives a request for self-managed data 106 from a client device 124. In an example, the client device 124 may be an internal client device 124A connected to the internal communications network 118. In another example, the client device 124 may be an external client device 124B connected to the external communications network 112. The request may include metadata 126 specifying which self-managed data 106 is being requested by the client device 124.

At operation 404, the back-end cloud server 114 identifies data permissions corresponding to the request. In an example, the data permissions for the request may be determined based on whether the client device 124 is connected to the internal communications network 118 or to the external communications network 112. For instance, a first level of access may be provided to the internal client devices 124A that access the data portal 122 via the internal communications network 118, and a second level of access may be provided to the external client devices 124B that access the data portal 122 via the external communications network 112. This may allow, in one example, for the internal client device 124A to be able to access the self-managed data 106 including embedded PII, while the external client device 124B may be able to access the self-managed data 106 but without the embedded PII.

At operation 406, the back-end cloud server 114 identifies files having metadata 126 corresponding to the request. For instance, the back-end cloud server 114 may query the self-managed data store 116 for self-managed data 106 matching the request. The back-end cloud server 114 may accordingly retrieve the matching self-managed data 106. In some examples, the data permissions may further indicate whether or not the client device 124 has access, and the back-end cloud server 114 may further limit the query according to whether the client devices 124 has permission to access term requested self-managed data 106. In another example, the self-managed data 106 may be stored in an encrypted form, and the data permissions may be used to query a key server for decryption keys to use to decrypt the self-managed data 106 matching the request. In such an example, if the permissions to the self-managed data 106 are revoked, the keys may be revoked by the key server, thereby rendering the self-managed data 106 unable to be decrypted.

At operation 408, the back-end cloud server 114 identifies whether a scrub event is indicated. For instance, the permissions determined at operation 404 may indicate that the client device 124 may access the self-managed data 106, but PII within the self-managed data 106 should be scrubbed. If so, control passes to operation 410 to remove the PII from the self-managed data 106. At operation 412, the back-end cloud server 114 sends the result to the client device 124. After operation 412, the process 400 ends.

Figure 5:
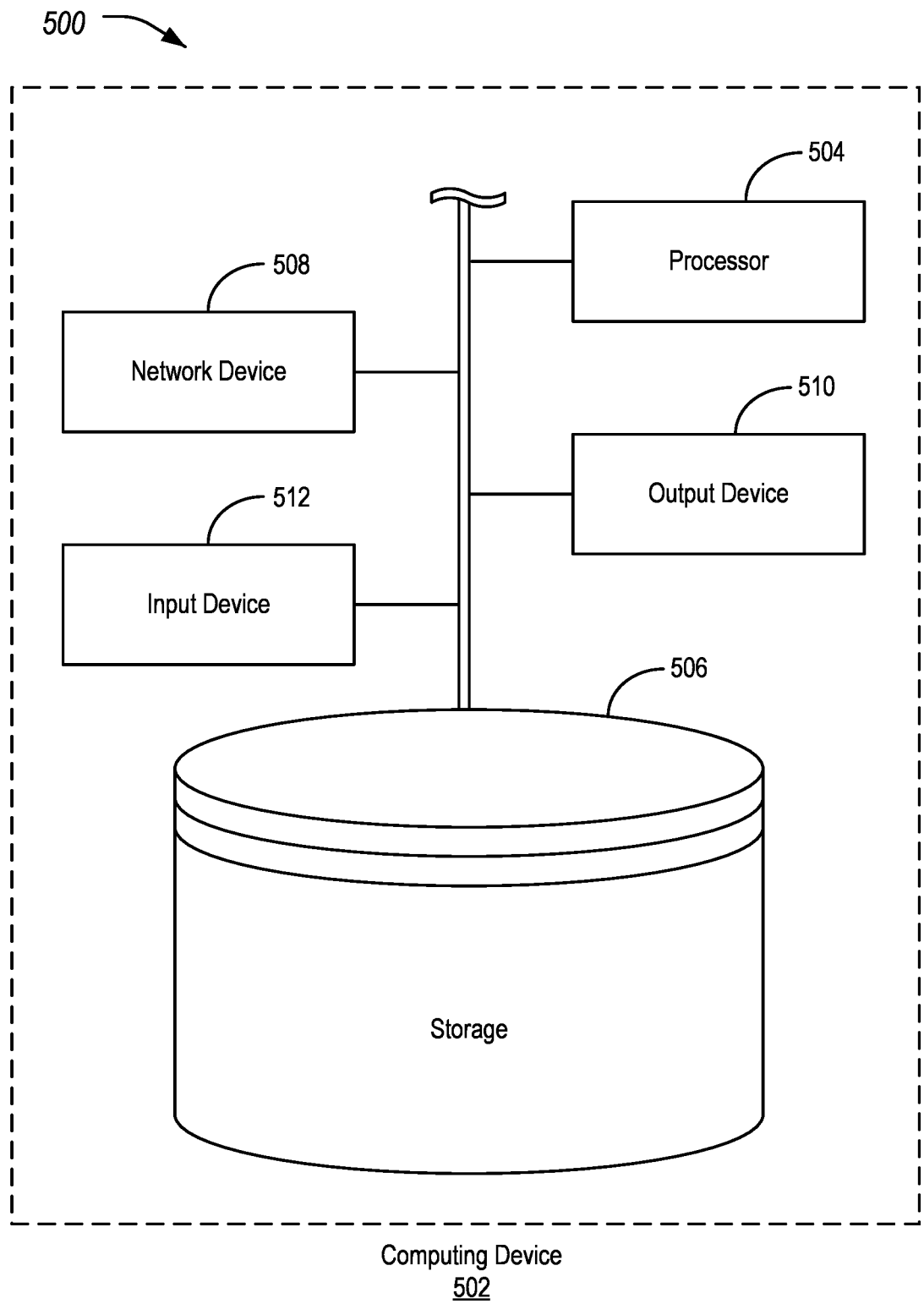
FIG. 5 illustrates an example of a computing device for ensuring privacy consent for the handling of occupant vehicle data.

FIG. 5 illustrates an example 500 of a computing device 502 for ensuring privacy consent for the handling of occupant self-managed data 106. Referring to FIG. 5, and with reference to FIGS. 1-4, the TCU 110, back-end cloud server 114, front-end cloud server 120, and client devices 124 may be examples of such computing devices 502. As shown, the computing device 502 includes a processor 504 that is operatively connected to a storage 506, a network device 508, an output device 510, and an input device 512. It should be noted that this is merely an example, and computing devices 502 with more, fewer, or different components may be used.

The processor 504 may include one or more integrated circuits that implement the functionality of a central processing unit (CPU) and/or graphics processing unit (GPU). In some examples, the processors 504 are a system on a chip (SoC) that integrates the functionality of the CPU and GPU. The SoC may optionally include other components such as, for example, the storage 506 and the network device 508 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or Microprocessor without Interlocked Pipeline Stage (MIPS) instruction set families.

Regardless of the specifics, during operation the processor 504 executes stored program instructions that are retrieved from the storage 506. The stored program instructions, accordingly, include software that controls the operation of the processors 504 to perform the operations described herein. The storage 506 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally 3D graphics to the output device 510. The output device 510 may include a graphical or visual display device, such as an electronic display screen, projector, printer, or any other suitable device that reproduces a graphical display. As another example, the output device 510 may include an audio device, such as a loudspeaker or headphone. As yet a further example, the output device 510 may include a tactile device, such as a mechanically raisable device that may, in an example, be configured to display braille or another physical output that may be touched to provide information to a user.

The input device 512 may include any of various devices that enable the computing device 502 to receive control input from users. Examples of suitable input devices that receive human interface inputs may include keyboards, mice, trackballs, touchscreens, voice input devices, graphics tablets, and the like.

The network devices 508 may each include any of various devices that enable the TCU 110, back-end cloud server 114, front-end cloud server 120, and client devices 124 to send and/or receive data from external devices over networks (such as the external communications network 112 and/or internal communications network 118). Examples of suitable network devices 508 include an Ethernet interface, a Wi-Fi transceiver, a cellular transceiver, or a BLUETOOTH or BLUETOOTH Low Energy (BLE) transceiver, ultra-wideband (UWB) transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for use of embedded metadata for data privacy compliance, comprising:
    a data store configured to maintain self-managed data, the self-managed data including metadata specifying retention policy data, the retention policy data indicating a first timeframe for scrubbing personally identifiable information (PII) from the self-managed data, and a second timeframe for deleting the self-managed data from the data store; and
    one or more servers, including one or more hardware processors, programmed to receive the self-managed data from a client device;
    bind the self-managed data to the retention policy data by embedded the retention policy data into metadata of the self-managed data;
    store the self-managed data including the embedded retention policy data to the data store;
    responsive to a self-update being indicated by the first timeframe of the embedded retention policy data to scrub the PII from the self-managed data, remove the PII from the self-managed data maintained by the data store,
    responsive to a self-update being indicated by the second timeframe of the embedded retention policy data to delete the self-managed data from the self-managed data, remove the self-managed data from the data store,
    provide a first level of access to a first client device configured to access a data portal via an internal communications network, the data portal providing access to the data store to client devices, and
    provide a second level of access to a second client device configured to access the data portal via an external communications network,
    wherein the self-managed data indicates a first active period during which the self-managed data is in use and editable, and a second period once the self-managed data is no longer active, in which the self-managed data is accessible to internal client devices but not to external client devices.

2. The system of claim 1, wherein the one or more servers are further programmed to, responsive to receipt of a removal request from a client device, the removal request indicating to remove PII of a user, remove PII from the self-managed data matching the user from the data store.

3. The system of claim 1, wherein the one or more servers are further programmed to, responsive to receipt of a removal request from a client device, the removal request indicating to remove or move the self-managed data of a user, remove or move the self-managed data matching the user from the data store.

4. The system of claim 1, wherein the one or more servers are further programmed to periodically check the retention policy data of the self-managed data to determine whether to perform the self-update to scrub the PII or to perform the self-update to delete the self-managed data.

5. The system of claim 1, wherein the one or more servers include:
   a backend server, connected to the internal communications network, configured to host the data store; and
   a frontend server, connected to the internal communications network and to the external communications network, configured to host the data portal providing the access to the data store to the client devices.

6. The system of claim 5, wherein the backend server is programmed to
   provide the first level of access to the first client device configured to access the data portal via the internal communications network; and
   provide the second level of access to the second client device configured to access the data portal via the external communications network.

7. The system of claim 1, wherein the first level of access includes access to the self-managed data including embedded PII, and the second level of access includes access to the self-managed data excluding the embedded PII.

8. The system of claim 1, wherein the self-managed data indicates the first active period where the self-managed data is in use and editable, and the second period once the data is no longer active, in which the self-managed data is maintained but cannot be edited.

9. A method for use of embedded metadata for data privacy compliance, comprising:
   receiving self-managed data from a client device;
   binding the self-managed data to a retention policy data by embedded the retention policy data into metadata of the self-managed data, the retention policy data indicating a first timeframe for scrubbing personally identifiable information (PII) from the self-managed data, and a second timeframe for deleting the self-managed data from a data store; maintaining, in a data store, the self-managed data including the metadata specifying the embedded retention policy data;
      responsive to a self-update to scrub PII from the self-managed data being indicated by the first timeframe of the embedded retention policy data, removing the PII from the self-managed data maintained by the data store;
      responsive to a self-update to delete the self-managed data from the self-managed data being indicated by the second timeframe of the embedded retention policy data, removing the self-managed data from the data store;
   providing a first level of access to a first client device configured to access a data portal via an internal communications network, the data portal providing access to the data store; and
   providing a second level of access to a second client device configured to access the data portal via an external communications network,
   wherein the self-managed data indicates a first active period during which the self-managed data is in use and editable, and a second period once the data is no longer active, in which the self-managed data is accessible to internal client devices but not to external client devices.

10. The method of claim 9, further comprising, responsive to receipt of a removal request from a client device, the removal request indicating to remove PII of a user, removing PII from the self-managed data matching the user from the data store.

11. The method of claim 9, further comprising, responsive to receipt of a removal request from a client device, the removal request indicating to remove or move the self-managed data of a user, removing or moving the self-managed data matching the user from the data store.

12. The method of claim 9, further comprising periodically checking the retention policy data of the self-managed data to determine whether to perform the self-update to scrub the PII or to perform the self-update to delete the self-managed data.

13. The method of claim 9, further comprising:
   a backend server, connected to the internal communications network, configured to host the data store; and
   a frontend server, connected to the internal communications network and to the external communications network, configured to host the data portal providing the access to the data store to the client devices.

14. The method of claim 9, further comprising:
   providing the first level of access to the first client device configured to access the data portal provided by a frontend server via the internal communications network connecting the frontend server to a backend server hosting the data store; and
   providing the second level of access to the second client device configured to access the data portal via the external communications network connected to the frontend server, wherein the backend server is inaccessible via the external communications network.

15. The method of claim 14, wherein the first level of access includes access to the self-managed data including embedded PII, and the second level of access includes access to the self-managed data excluding the embedded PII.

16. A non-transitory computer-readable medium comprising instructions that, when executed by one or more servers, cause the one or more servers to perform operations including to:
   receive self-managed data from a client device;
   bind the self-managed data to a retention policy data by embedded the retention policy data into metadata of the self-managed data, the retention policy data indicating a first timeframe for scrubbing personally identifiable information (PII) from the self-managed data, and a second timeframe for deleting the self-managed data from a data store; maintain, in a data store, the self-managed data including the metadata specifying the embedded retention policy data;
   periodically check the embedded retention policy data of the self-managed data to determine whether to perform a self-update to scrub PII from the self-managed data or to perform a self-update to delete the self-managed data;
      responsive to the self-update to scrub the PII from the self-managed data being indicated by the first timeframe of the embedded retention policy data, remove the PII from the self-managed data maintained by the data store;
      responsive to the self-update to delete the self-managed data from the self-managed data being indicated by the second timeframe of the embedded retention policy data, remove the self-managed data from the data store;
   responsive to receipt of a removal request from the client device, the removal request indicating to remove PII of a user, remove PII from the self-managed data matching the user from the data store;
   provide a first level of access to a first client device configured to access a data portal via an internal communications network, the data portal providing access to the data store; and provide a second level of access to a second client device configured to access the data portal via an external communications network, wherein the self-managed data indicates a first active period during which the self-managed data is in use and editable, and a second period once the data is no longer active, in which the self-managed data is accessible to internal client devices but not to external client devices.

17. The medium of claim 16, wherein the one or more servers include:

a backend server, connected to the internal communications network, configured to host the data store; and a frontend server, connected to the internal communications network and to the external communications network, configured to host the data portal providing the access to the data store to the client devices.

18. The medium of claim 17, wherein the first level of access includes access to the self-managed data including embedded PII, and the second level of access includes access to the self-managed data excluding the embedded PII.

\* \* \* \* \*